United States Patent
Yang et al.

(10) Patent No.: US 9,913,528 B2
(45) Date of Patent: Mar. 13, 2018

(54) RETRACTABLE BRUSH

(71) Applicant: DFUZZ, LLC, Corona del Mar, CA (US)

(72) Inventors: Ching-Chung Yang, Corona del Mar, CA (US); Rosalind Ann Vedovitch, Corona del Mar, CA (US)

(73) Assignee: Nancy Allari, Corona del Mar, CA (US)

( * ) Notice: Subject to any disclaimer, the term of this patent is extended or adjusted under 35 U.S.C. 154(b) by 171 days.

(21) Appl. No.: 15/068,818

(22) Filed: Mar. 14, 2016

(65) Prior Publication Data

US 2017/0258215 A1  Sep. 14, 2017

(51) Int. Cl.
*A46B 7/02* (2006.01)
*A46B 9/02* (2006.01)

(52) U.S. Cl.
CPC ............ *A46B 7/023* (2013.01); *A46B 9/023* (2013.01)

(58) Field of Classification Search
CPC .......... A46B 7/023; A46B 7/026; A46B 9/10; A46B 15/0095; A46B 17/04; A46B 17/06
USPC .......... 15/169, 184, 185, 201; 119/625, 628, 119/629; 132/119–121, 123
See application file for complete search history.

(56) References Cited

U.S. PATENT DOCUMENTS

| | | | |
|---|---|---|---|
| 1,189,698 A * | 7/1916 | Keating | A46B 7/023 15/184 |
| 1,280,180 A * | 10/1918 | Deason | A46B 15/00 132/121 |
| 2,660,183 A * | 11/1953 | Gruring | A47K 11/10 132/119 |
| 3,765,049 A * | 10/1973 | Green | A46B 9/10 132/119 |
| 4,023,230 A * | 5/1977 | Friedman | A46B 7/023 132/119 |
| 4,191,200 A * | 3/1980 | Renda | A45D 20/50 132/123 |
| 4,225,997 A * | 10/1980 | Thomas | A46B 7/023 15/169 |

(Continued)

FOREIGN PATENT DOCUMENTS

| | | | |
|---|---|---|---|
| EP | 2636337 | * | 9/2013 |
| GB | 2174593 | * | 11/1986 |
| JP | 2003-210251 | * | 7/2003 |

*Primary Examiner* — Mark Spisich
(74) *Attorney, Agent, or Firm* — Sandra Thompson; Finlayson Toffer Roosevelt & Lilly LLP

(57) ABSTRACT

As disclosed herein, a contemplated retractable brush includes: a brush shell, comprising a brush head, a plurality of bristle openings, a mateable lock fixture and a brush handle; a bristle release mechanism, comprising a locking mechanism, a bristle extender mechanism and an engagement mechanism, wherein the engagement mechanism is operatively coupled to the locking mechanism and the bristle extender mechanism; a first bristle platform, comprising a first plurality of bristles; a second bristle platform, comprising a second plurality of bristles; wherein the first bristle platform and the second bristle platform are operatively coupled with the bristle extender mechanism; and wherein the first and the second plurality of bristles are extended through the plurality of bristle openings to outside of the brush shell when the engagement mechanism and the locking mechanism are operatively engaged.

11 Claims, 8 Drawing Sheets

(56) References Cited

U.S. PATENT DOCUMENTS

| | | | | |
|---|---|---|---|---|
| 4,412,365 A | * | 11/1983 | Schmitt | A46B 7/023 132/121 |
| 4,574,416 A | * | 3/1986 | Stewart | A46B 7/023 119/628 |
| 4,977,909 A | * | 12/1990 | Chou | A45D 19/02 132/116 |
| 4,987,633 A | * | 1/1991 | Heneveld | A46B 7/023 132/121 |
| 5,133,103 A | * | 7/1992 | Nagasawa | A46B 7/023 132/123 |
| 2002/0078971 A1 | * | 6/2002 | Anderson | A46B 9/10 132/123 |
| 2013/0263882 A1 | * | 10/2013 | Kim | A45D 1/04 132/229 |

* cited by examiner

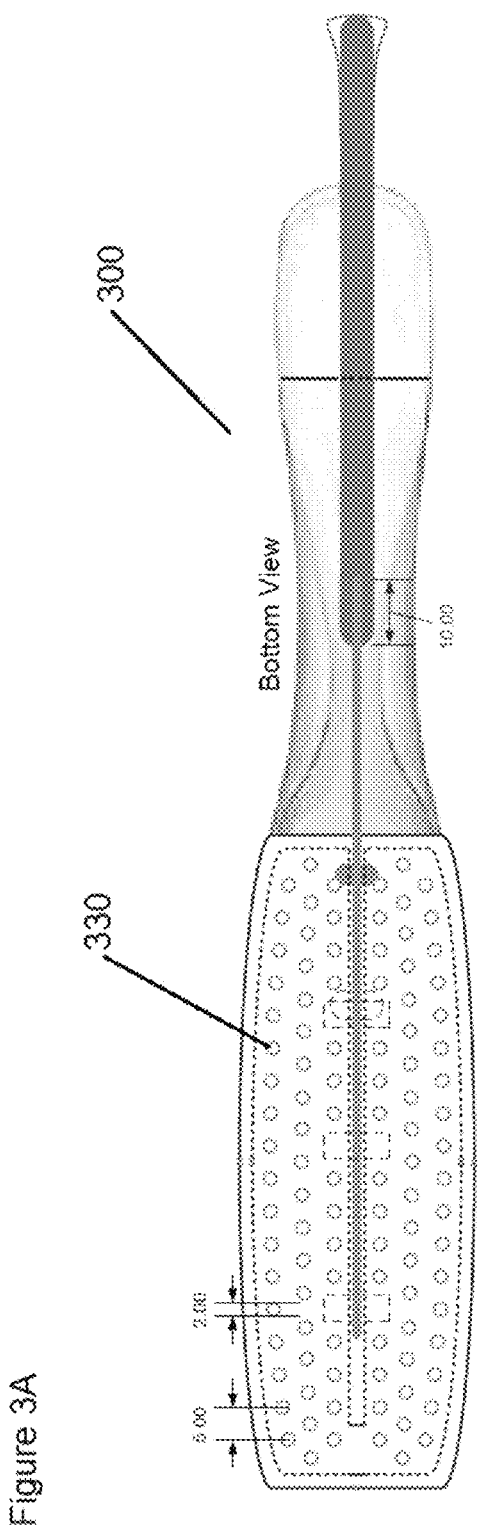

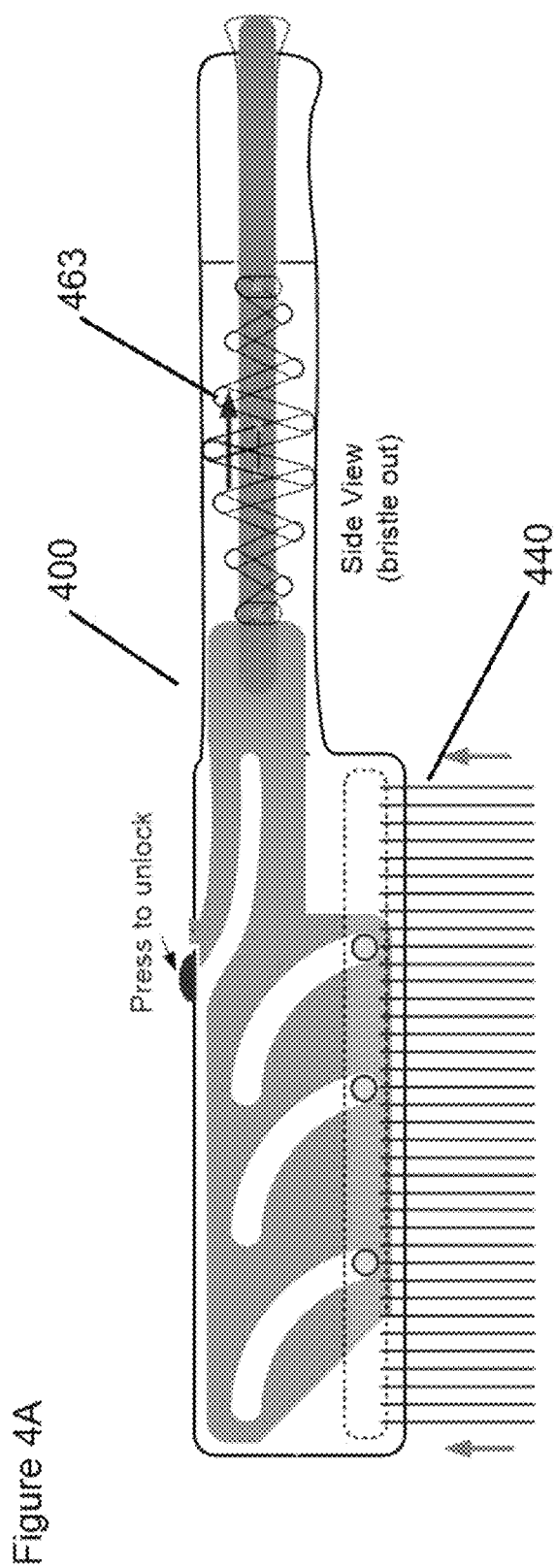

RETRACTABLE BRUSH

FIELD OF THE SUBJECT MATTER

The field of the subject matter is retractable brushes.

BACKGROUND

Brushes, in some shape or form and for both humans and animals/pets, have been around for hundreds of years. Brush technology has changed considerably in that time to design brushes that can be easily disassembled and cleaned, can hold other products, can discharge hair or fur easily, can be used to straighten hair, can be used to curl hair, can heat up or can fold up.

One group of brushes has been designed to easily eject hair or fur from them. For example, in U.S. Pat. No. 6,427,633 issued to Patsy Ogden, a pet brush is disclosed where the bristles are fixed and a cleaning element is engaged by the user pressing a control element. The cleaning element sweeps the bristles, thus pushing hair or fur off of the bristles, so that the hair or fur is easily discharged from the brush. While this brush satisfactorily cleans fur or hair from the bristles, the bristles remain exposed. This brush is not easily stored in a drawer, bag or purse, because of the exposed bristles. In addition, the bristles can become damaged or broken, because they are exposed to general wear and tear.

U.S. Pat. No. 3,059,260 issued to Lester Peilet shows a "Spring Actuated Self-Cleaning Retractable Brush". This brush relies on a spring in the handle that moves the bristles from a retracted state to an exposed state. While this solves some of the problems inherent in leaving the bristles exposed, the wear and tear on the handle and the fact that it can be separated from the brush head can lead to a shorter life of the brush as a whole.

U.S. Pat. No. 7,506,396 issued to Joe J. DiPippo discloses a self-cleaning hair brush that is round and wherein the bristles again are fixed in place and "cleaning elements" are moved out and along the bristles by rotating an end-piece on the handle. It is possible to leave the cleaning elements engaged (and the bristles behind them), but the bristles and the inner workings of the brush are exposed, if the cleaning elements are left in the protracted position. Therefore, this brush is similar to the pet brush described already herein.

U.S. Pat. No. 2,486,203 issued to Herman C. Pieper discloses a brush with retractable bristles, wherein the bristles are attached to a track that slides inside the shell of the brush with the help of a user-engaged moveable member. This design creates some problems in use, because the bristles are tufted and designed to spread apart once they are exposed outside the brush shell. This tufted design can create problems with cleaning the brush, as skin cells and dirt can collect inside the tufts and be drawn back into the brush shell when the bristles are retracted.

To this end, it would be desirable to form and utilize a retractable brush that can a) minimize damage to the inside of a purse or bag, b) keep from interacting with tissues, c) keep from discharging or shedding loose hairs into a bag or purse, d) be easy to clean, and e) be used for pets and humans.

SUMMARY OF THE SUBJECT MATTER

As disclosed herein, a contemplated retractable brush includes: a brush shell, comprising a brush head, a plurality of bristle openings, a mateable lock fixture and a brush handle; a bristle release mechanism, comprising a locking mechanism, a bristle extender mechanism and an engagement mechanism, wherein the engagement mechanism is operatively coupled to the locking mechanism and the bristle extender mechanism; a first bristle platform, comprising a first plurality of bristles; a second bristle platform, comprising a second plurality of bristles; wherein the first bristle platform and the second bristle platform are operatively coupled with the bristle extender mechanism; and wherein the first and the second plurality of bristles are extended through the plurality of bristle openings to outside of the brush shell when the engagement mechanism and the locking mechanism are operatively engaged.

BRIEF DESCRIPTION OF THE FIGURES

FIGS. 3A and 3B show the bottom view of two contemplated retractable brushes with the bristles retracted.

FIGS. 4A and 4B show the side view of two contemplated retractable brushes with the bristles extended.

DETAILED DESCRIPTION

A retractable brush has been developed and is disclosed herein that a) minimizes damage to the inside of a purse or bag, b) keeps the brush and bristles from interacting with tissues, c) keeps from discharging or shedding loose hairs into a bag or purse, d) is easy to clean, and e) can be used for, on or with pets and humans.

As disclosed herein, a contemplated retractable brush includes: a brush shell, comprising a brush head, a plurality of bristle openings, a mateable lock fixture and a brush handle; a bristle release mechanism, comprising a locking mechanism, a bristle extender mechanism and an engagement mechanism, wherein the engagement mechanism is operatively coupled to the locking mechanism and the bristle extender mechanism; a first bristle platform, comprising a first plurality of bristles; a second bristle platform, comprising a second plurality of bristles; wherein the first bristle platform and the second bristle platform are operatively coupled with the bristle extender mechanism and may be coupled to one another through a bridge or connection unit; and wherein the first and the second plurality of bristles are extended through the plurality of bristle openings to outside of the brush shell when the engagement mechanism and the locking mechanism are operatively engaging and then engaged. In contemplated embodiments, the mateable lock fixture is designed to couple with, engage with or operatively mate with the locking mechanism. In other contemplated embodiments, the engagement mechanism is designed to be engaged by the user. The user can also disengage the locking mechanism from the mateable lock fixture.

Figure 1A:
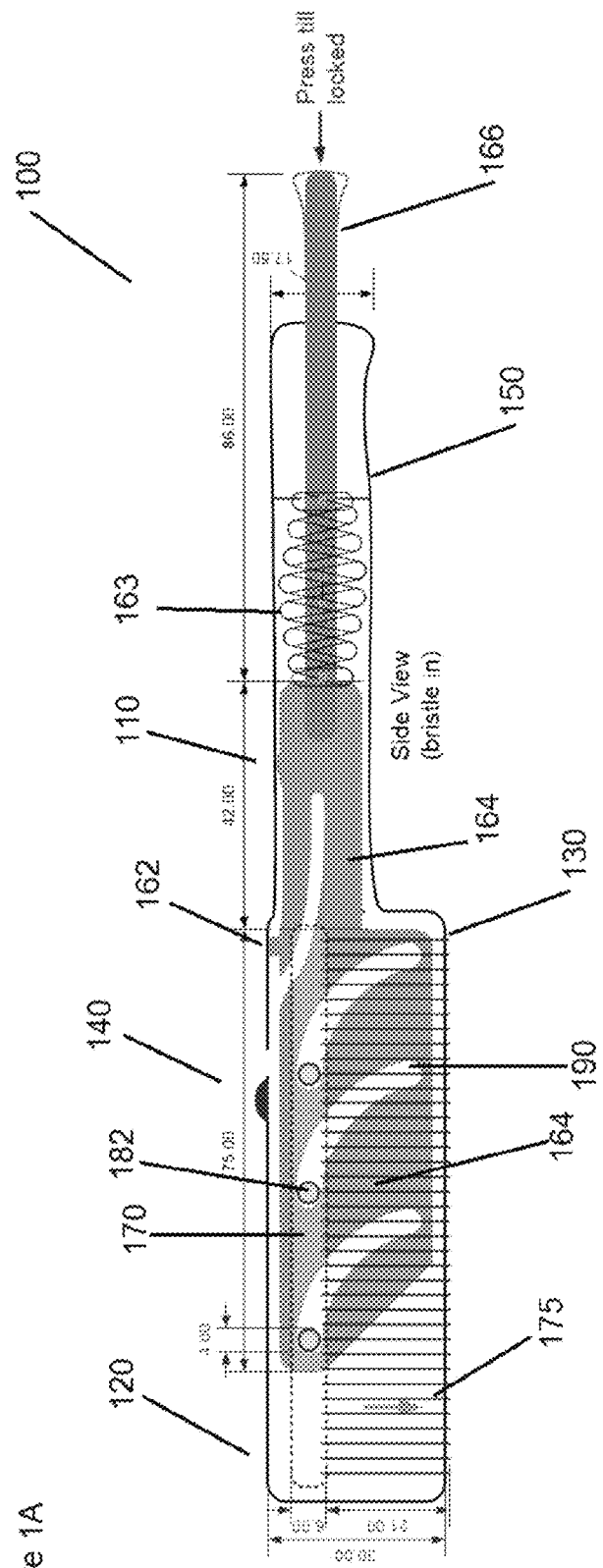
FIGS. 1A and 1B show the side view of two contemplated retractable brushes.
Figure 1B:
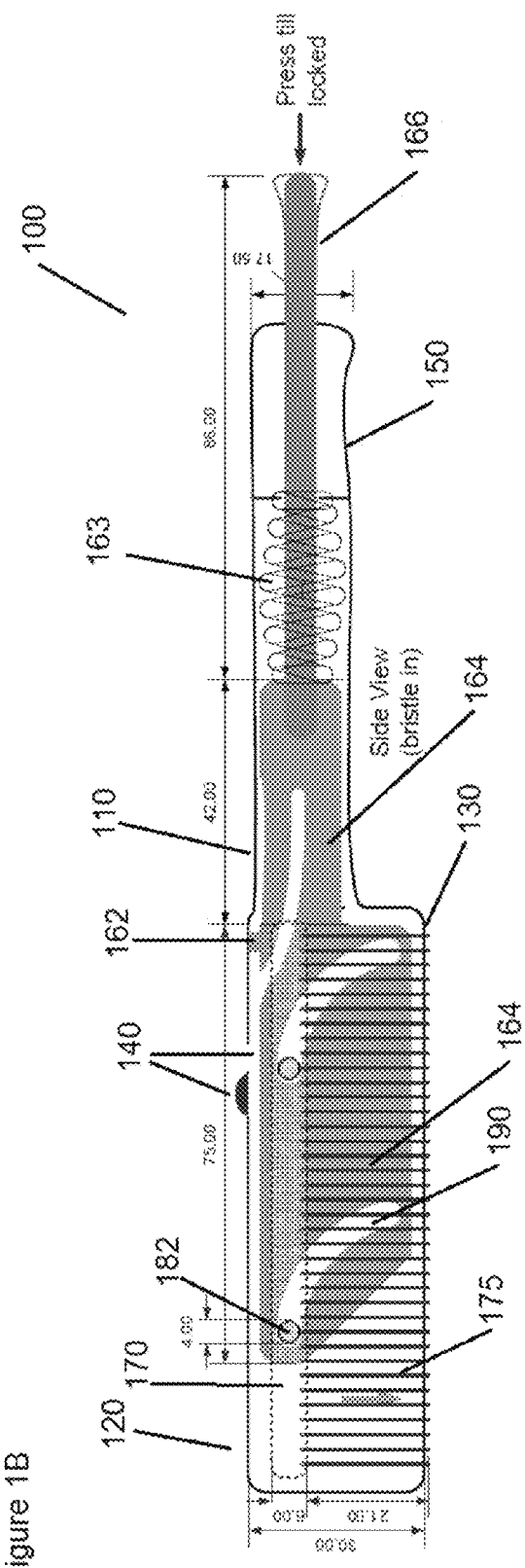

FIG. 1A having three tracks and three rod connectors and FIG. 1B having two tracks and two rod connectors show a contemplated retractable brush 100 that includes: a brush shell 110, comprising a brush head 120, a plurality of bristle openings 130, a mateable lock fixture 140 having an opening in the brush shell and a press point, and a brush handle 150; a bristle release mechanism, comprising a locking mechanism 162, a bristle extender mechanism 164 and an engagement mechanism 166, wherein the engagement mechanism 166 is operatively coupled to the locking mechanism 162 and comprises a tension component, which in this case is a spring 163 (or 463, in FIG. 4A), and the bristle extender mechanism 164; a first bristle platform 170, comprising a first plurality of bristles 175; a second bristle platform (not shown), comprising a second plurality of bristles (not shown); wherein the first bristle platform and the second bristle platform are operatively coupled with the bristle extender mechanism 164; and wherein the first and the second plurality of bristles are extended through the plurality of bristle openings to outside of the brush shell when the engagement mechanism and the locking mechanism are operatively engaged. In contemplated embodiments, a tension component is coupled with and a part of the engagement mechanism and is also coupled with the bristle extender mechanism to help propel the bristle extender mechanism forward and also to help it snap back when the locking mechanism is engaged and disengaged, respectively.

Figure 2A:
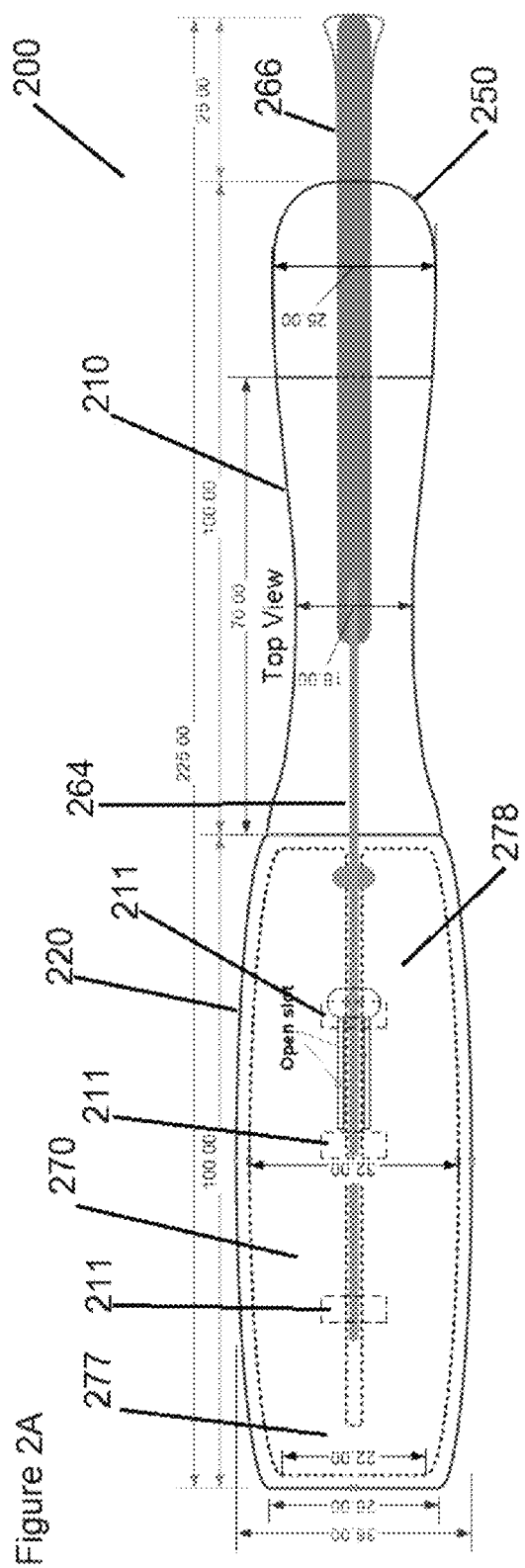
FIGS. 2A and 2B show the top view of two contemplated retractable brushes.
Figure 2B:
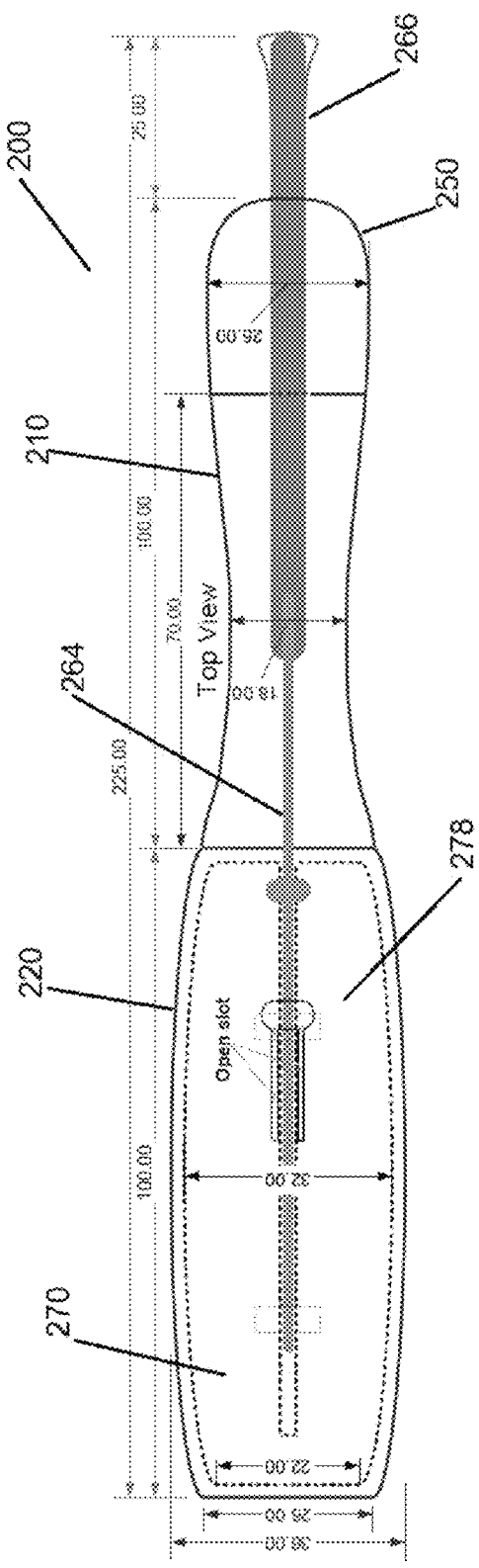

FIG. 2A having three tracks and three rod connectors (shown in broken lines by Reference Number 211) and FIG. 2B having two tracks and two rod connectors show a contemplated retractable brush 200 that includes: a brush shell 210, comprising a brush head 220, a plurality of bristle openings (not shown), a mateable lock fixture (not shown) and a brush handle 250; a bristle release mechanism, comprising a locking mechanism (not shown), a bristle extender mechanism 264 and an engagement mechanism 266, wherein the engagement mechanism 266 is operatively coupled to the locking mechanism and the bristle extender mechanism 264; a first bristle platform 270, comprising a first plurality of bristles (not shown); a second bristle platform 278, comprising a second plurality of bristles (not shown); wherein the first bristle platform and the second bristle platform are operatively coupled with the bristle extender mechanism 264; and wherein the first and the second plurality of bristles are extended through the plurality of bristle openings to outside of the brush shell when the engagement mechanism and the locking mechanism are operatively engaged. As shown in FIG. 2A, the first bristle platform 270 and the second bristle platform 278 may be connected to one another through a bridge 277.

Figure 3B:
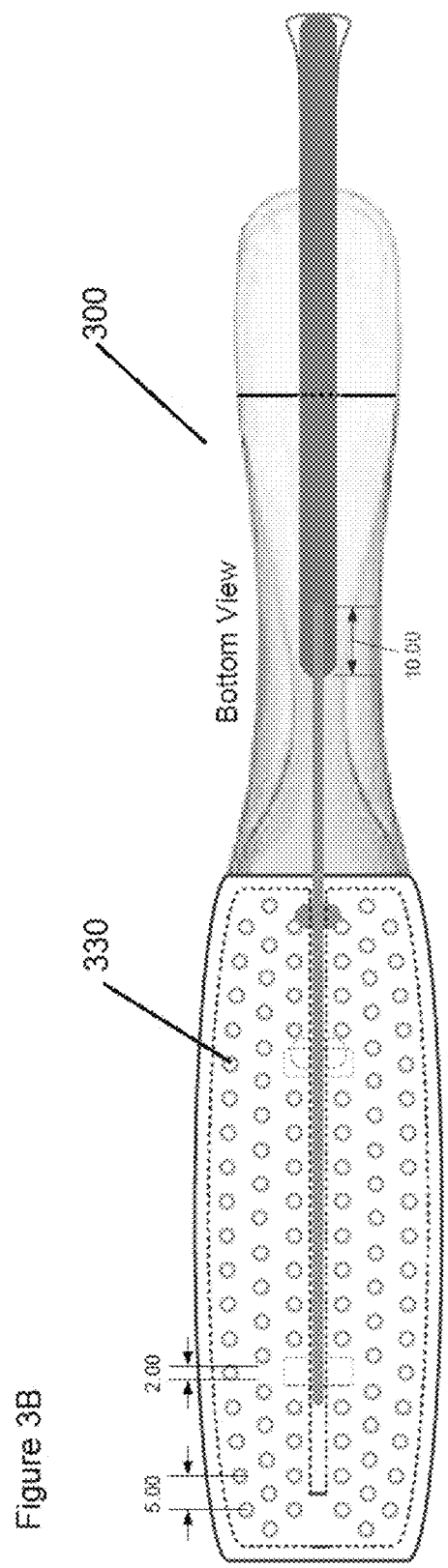

FIG. 3A having three tracks and three rod connectors and FIG. 3B having two tracks and two rod connectors show a contemplated retractable brush 300 that includes: a brush shell, comprising a brush head, a plurality of bristle openings 330 a mateable lock fixture (not shown) and a brush handle; a bristle release mechanism, comprising a locking mechanism (not shown), a bristle extender mechanism and an engagement mechanism, wherein the engagement mechanism is operatively coupled to the locking mechanism and the bristle extender mechanism; a first bristle platform, comprising a first plurality of bristles (not shown); a second bristle platform, comprising a second plurality of bristles (not shown); wherein the first bristle platform and the second bristle platform are operatively coupled with the bristle extender mechanism; and wherein the first and the second plurality of bristles are extended through the plurality of bristle openings to outside of the brush shell when the engagement mechanism and the locking mechanism are operatively engaged.

Figure 4B:
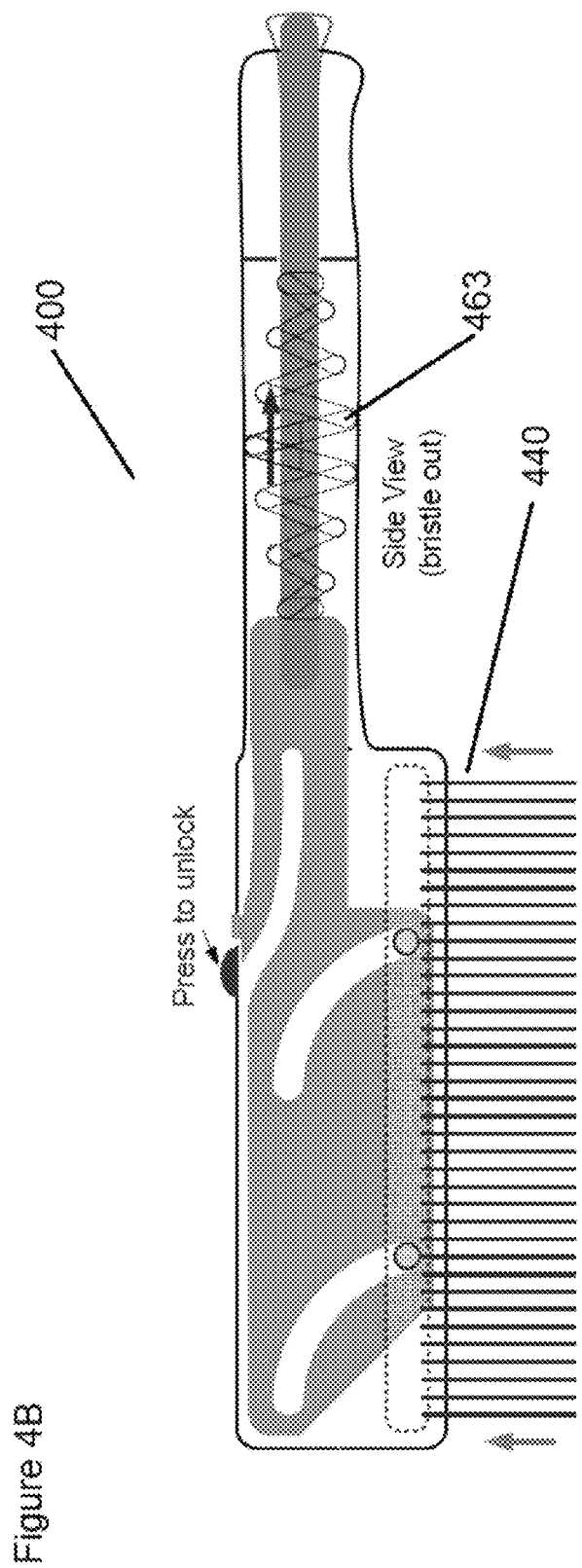

FIG. 4A having three tracks and three rod connectors and FIG. 4B having two tracks and two rod connectors show a contemplated retractable brush 400 that includes: a brush shell, comprising a brush head, a plurality of bristle openings, a mateable lock fixture and a brush handle; a bristle release mechanism, comprising a locking mechanism, a bristle extender mechanism and an engagement mechanism, wherein the engagement mechanism is operatively coupled to the locking mechanism and the bristle extender mechanism; a first bristle platform, comprising a first plurality of bristles 440; a second bristle platform, comprising a second plurality of bristles; wherein the first bristle platform and the second bristle platform are operatively coupled with the bristle extender mechanism; and wherein the first and the second plurality of bristles are extended through the plurality of bristle openings to outside of the brush shell when the engagement mechanism and the locking mechanism are operatively engaged.

In a contemplated embodiment, the brush may comprise the same material for all of the components, including the brush shell, the bristle release mechanism and the plurality of bristles, but in most embodiments, the material used for the handle and the base is going to be hard or solid and the material used for the bristles is going to be flexible and malleable. A contemplated material may comprise plastic, polymer material, composite material, graphite material, a metal-based material, a sustainable or "green" material, such as bamboo or a combination thereof.

A contemplated retractable brush can be manufactured with different combinations of materials, lengths, diameters and in different colors. The handle segment can be manufactured in any desired shape and does not necessarily have to match the shape of the base of the retractable brush. In many embodiments, however, the brush shell as a whole will be one piece and will be aesthetically pleasing.

The operation of contemplated retractable brushes is probably best understood by discussing in detail the specific components and how each component works together with the other components. For example, the first and the second plurality of bristles are extended through the plurality of bristle openings to outside of the brush shell and locked securely in place when the locking mechanism is locked into place by being operatively coupled with the mateable lock fixture that is a part of the brush shell.

In order to understand how the bristles move from the inside of the brush shell to the outside of the brush shell, the bristle release mechanism should be reviewed in conjunction with the bristle platforms. A contemplated first bristle platform and a contemplated second bristle platform are connected to each other by at least one rod connector. In some embodiments, there are at least two (FIG. 1A) and sometimes three (FIG. 1B) rod connectors.

In contemplated embodiments, each of the at least one rod connector runs perpendicular through a corresponding track on the bristle extender mechanism. The corresponding track on the bristle extender mechanism is designed to allow the at least one rod connector to move from a first end of the track to a second end of the track, wherein the first bristle platform and the second bristle platform also move to extend each of the plurality of bristles through the bristle openings and to the outside of the brush shell.

In contemplated embodiments, the bristle extender mechanism moves the at least one rod connector from the first end of the track to the second end of the track when the bristle extender mechanism is operatively and actively engaged by a user pushing the engagement mechanism toward and into the brush shell. The at least one rod connector, which is shown in FIGS. 1A and 1B as Reference Number 182 is then fixed at the second end of the track, which is shown in FIG. 1B as Reference Number 190, when locking mechanism engages with the mateable lock fixture.

In other embodiments, the bristle extender mechanism moves the at least one rod connector from the second end of the track to the first end of the track when the bristle extender mechanism is operatively and actively engaged by a user disengaging the locking mechanism from the mateable lock fixture. In this embodiment, the bristles are retracted back into the brush shell, such that the brush can be stored easily or transported without damage to the bristles.

Thus, specific embodiments, methods of retractable brushes have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A retractable brush, comprising:
   a brush shell, comprising a brush head, a plurality of bristle openings, a mateable lock fixture and a brush handle;
   a bristle release mechanism, comprising a locking mechanism, a bristle extender mechanism and an engagement mechanism, wherein the engagement mechanism is operatively coupled to the locking mechanism and the bristle extender mechanism;
   a first bristle platform, comprising a first plurality of bristles;
   a second bristle platform, comprising a second plurality of bristles;
   wherein the first bristle platform and the second bristle platform are connected to each other by at least one rod connector and wherein each of the at least one rod connector runs perpendicular through a corresponding track on the bristle extender mechanism; and
   wherein the first and the second plurality of bristles are extended through the plurality of bristle openings to outside of the brush shell when the engagement mechanism and the locking mechanism are operatively engaged.

2. The retractable brush of claim 1, wherein the first and the second plurality of bristles are extended through the plurality of bristle openings to outside of the brush shell and locked securely in place when the locking mechanism is locked into place by being operatively coupled with the mateable lock fixture.

3. The retractable brush of claim 1, wherein the corresponding track on the bristle extender mechanism is designed to allow the at least one rod connector to move from a first end of the track to a second end of the track, wherein the first bristle platform and the second bristle platform also move to extend each of the plurality of bristles through the bristle openings and to the outside of the brush shell.

4. The retractable brush of claim 3, wherein the bristle extender mechanism moves the at least one rod connector from the first end of the track to the second end of the track when the bristle extender mechanism is operatively and actively engaged by a user pushing the engagement mechanism toward and into the brush shell.

5. The retractable brush of claim 4, wherein the at least one rod connector is fixed at the second end of the track when the locking mechanism engages with the mateable lock fixture.

6. The retractable brush of claim 3, wherein the bristle extender mechanism moves the at least one rod connector from the second end of the track to the first end of the track when the bristle extender mechanism is operatively and actively engaged by a user disengaging the locking mechanism from the mateable lock fixture.

7. The retractable brush of claim 1, wherein at least one of the components comprise plastic.

8. The retractable brush of claim 1, wherein at least one of the components are hard plastic, flexible or soft plastic, or a combination thereof.

9. The retractable brush of claim 1, wherein the engagement mechanism comprises a tension component.

10. The retractable brush of claim 9, wherein the tension component is a spring.

11. The retractable brush of claim 1, wherein the first bristle platform and the second bristle platform are further connected to one another by a bridge.

\* \* \* \* \*